(12) United States Patent
Kageyama

(10) Patent No.: US 7,818,437 B2
(45) Date of Patent: Oct. 19, 2010

(54) CONNECTION MANAGEMENT SYSTEM, CONNECTION MANAGEMENT METHOD, AND MANAGEMENT SERVER

(75) Inventor: Yoshiteru Kageyama, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 391 days.

(21) Appl. No.: 11/711,023

(22) Filed: Feb. 27, 2007

(65) Prior Publication Data
US 2008/0034099 A1 Feb. 7, 2008

(30) Foreign Application Priority Data
Aug. 7, 2006 (JP) ............................. P2006-214001

(51) Int. Cl.
*G06F 15/16* (2006.01)
(52) U.S. Cl. ...................................... 709/229
(58) Field of Classification Search ................. 709/227, 709/228, 229
See application file for complete search history.

(56) References Cited

U.S. PATENT DOCUMENTS

2002/0099831 A1* 7/2002 Tsunogai .................... 709/227
2003/0154306 A1* 8/2003 Perry ......................... 709/245
2004/0049702 A1* 3/2004 Subramaniam et al. ...... 713/201
2006/0031442 A1* 2/2006 Ashley et al. ................ 709/223

FOREIGN PATENT DOCUMENTS

JP 2001-251367 9/2001
JP 2004-005427 1/2004

* cited by examiner

*Primary Examiner*—Wing F Chan
*Assistant Examiner*—Tesfay Yohannes
(74) *Attorney, Agent, or Firm*—Finnegan, Henderson, Farabow, Garrett & Dunner, L.L.P.

(57) ABSTRACT

A reverse proxy server relays data between a client terminal connected to an external network and a host computer installed in an internal network segment using a session ID. A management server, in response to a connection request from the client terminal to the host computer via the reverse proxy server, decides whether a connection to the host computer is permitted based on host PC data having a host PC name of the host computer and a service name distributable by the host computer, and notifies the reverse proxy server and the host computer of the session ID to start connection when the connection is permitted. The host computer sends service data with the session ID after receiving the session ID. The reverse proxy server sends the service data from the host computer to the client terminal, and in response to data from the client terminal, sends the data with the session ID to the host computer.

21 Claims, 8 Drawing Sheets

| |
|---|
| HOST PC NAME |
| MAC ADDRESS |
| IP ADDRESS |
| GROUP NAME |
| DISTRIBUTABLE SERVICE NAME |
| MAXIMUM NUMBER OF CONNECTABLE TERMINALS OR MAXIMUM NUMBER OF ISSUABLE SESSION IDS |
| NUMBER OF CLIENT TERMINALS PRESENTLY CONNECTED |
| MAXIMUM NUMBER OF AVAILABLE NETWORK TRAFFIC |
| PRESENT NETWORK TRAFFIC |

FIG. 3

CONNECTION MANAGEMENT SYSTEM, CONNECTION MANAGEMENT METHOD, AND MANAGEMENT SERVER

CROSS-REFERENCE TO RELATED APPLICATIONS

This application is based upon and claims the benefit of priority from prior Japanese Patent Application No. 2006-214001, filed on Aug. 7, 2006; the entire contents of which are incorporated herein by reference.

FIELD OF THE INVENTION

The present invention relates to a connection management system, a connection management method, and a management system for managing a connection between a client terminal connected to an external network and a host PC installed in an internal network segment.

BACKGROUND OF THE INVENTION

A system may access a host PC (Personal Computer) in the Intranet from a client terminal in an external network. In this system, in case of communicating between the client terminal and the host PC, a firewall often exists between the client terminal and the host PC. In order to pass a communication packet through the firewall, a protocol of the communication packet is converted to a protocol permitted to pass the firewall such as HTTP (Hypertext Transfer Protocol), and the communication packet is sent. Then a proxy server in the Intranet reconverts the protocol of the communication packet to a protocol directed to the host PC. This technique is disclosed in JP-A (Kokai) No. 2004-005427 (Hereinafter, a reference 1).

On the other hand, a server in the Intranet (inside the firewall) may connect to the client terminal in the external network. For example, an intermediary server is set to intermediate (relay) communication between a client program and a server program, and the intermediary server and the client terminal respectively prepare a table to store pass information representing data-transmission destination. In case of starting communication, a path from the client terminal to the server is specified by tracing the path information from the client terminal in order. Thus a communication from the client terminal to the server is established. This technique is disclosed in JP-A (Kokai) No. 2001-251367 (Hereinafter, a reference 2).

In the reference 1, a packet from the client terminal can be input to an internal network (Intranet). However, management processing of connection to the host PC in the internal network is not taken into consideration.

In the reference 2, a communication packet and a reply packet directed to a listen port of the server program must be previously permitted to pass by each firewall. In this case, by increasing services distributed by the server, a number of listen ports necessary to permit passing by each firewall also increases. As a result, security of the entire network falls. Briefly, a method for establishing communication between the client terminal and the server is necessary while the number of packets permitted to pass at each firewall is minimized. However, in the reference 2, such method is not taken into consideration.

In case of Skype (voice communication software applying P2P technique) using connection method of P2P (Peer to Peer) type, in order for a destination PC inside a NAT (Network Address Translation) router to start voice communication, a server called "super node" is selected from a plurality of PCs each installing Skype. The destination PC and a source PC (client terminal) previously create a connection for control with the super node. In case of calling, by notifying the destination PC inside the NAT router of call start using the connection for control, the host PC (destination PC) starts communication to pass through the NAT rooter.

However, in P2P communication technique, it is on the assumption that a unique service is provided. Accordingly, in case that the host PC provides the same service to a plurality of users (client terminals) or that a plurality of host PCs provides the same service to a user (client terminal), a function to share the service is not taken into consideration. Furthermore, in case that a power of the host PC which provides service temporarily turns off, a function to automatically turn on the power to start service supply is not taken into consideration.

SUMMARY OF THE INVENTION

The present invention is directed to a connection management system, a connection management method, and a management system for connecting a client terminal in an external network with a host PC in an internal network segment without connection management by an external network side.

According to an aspect of the present invention, there is provided a system for managing a connection between a client terminal connected to an external network and a host computer installed in an internal network segment, the system comprising: a reverse proxy server configured to relay data between the client terminal and the host computer using a session ID; and a management server configured to, in response to a connection request from the client terminal to the host computer via the reverse proxy server, decide whether a connection to the host computer is permitted based on host PC data having a host PC name of the host computer and a service name distributable by the host computer, and configured to notify the reverse proxy server and the host computer of the session ID to start connection when the connection is permitted; wherein the host computer sends service data with the session ID after receiving the session ID, and wherein the reverse proxy server sends the service data from the host computer to the client terminal, and in response to data from the client terminal, sends the data with the session ID to the host computer.

According to another aspect of the present invention, there is also provided a method for managing a connection between a client terminal connected to an external network and a host computer installed in an internal network segment, the method comprising: receiving a connection request from the client terminal to the host computer via a reverse proxy server which relays data between the client terminal and the host computer using a session ID; deciding whether a connection to the host computer is permitted based on host PC data having a host PC name of the host computer and a service name distributable by the host computer; and notifying the reverse proxy server and the host computer of the session ID to start connection when the connection is permitted; wherein the host computer sends service data with the session ID after receiving the session ID, and wherein the reverse proxy server sends the service data from the host computer to the client terminal, and in response to data from the client terminal, sends the data with the session ID to the host computer.

According to still another aspect of the present invention, there is also provided a management server for managing a connection between a client terminal connected to an external network and a host computer installed in an internal network segment, the management server comprising: a storage unit configured to store host PC data having a host PC name of the host computer and a service name distributable by the host computer; a connection decision unit configured to, in response to a connection request from the client terminal to the host computer via a reverse proxy server which relays data between the client terminal and the host computer using a session ID, decide whether a connection to the host computer is permitted based on the host PC data; a notification unit configured to notify the reverse proxy server and the host computer of the session ID when the connection is permitted; and a communication request unit configured to request the host computer to send service data with the session ID to the reverse proxy server.

BRIEF DESCRIPTION OF THE DRAWINGS

FIG. 3 is one example of host PC data stored in a host PD data DB in FIG. 1.

DETAILED DESCRIPTION OF THE EMBODIMENTS

Figure 1:
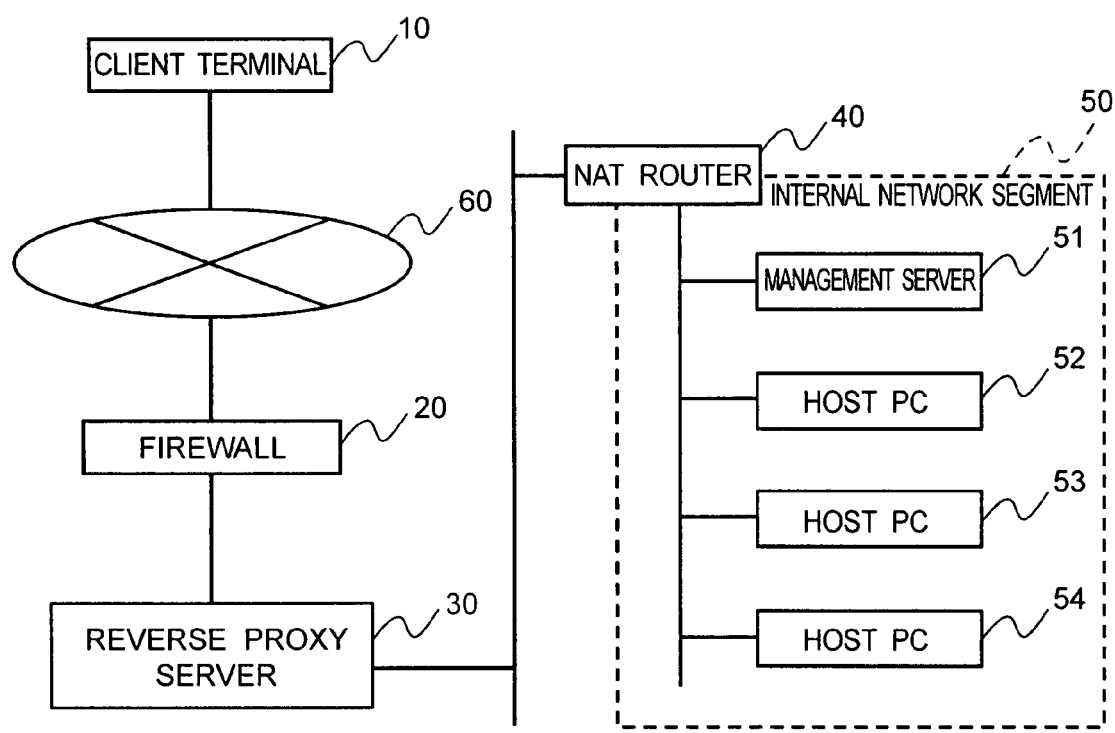
FIG. 1 is a block diagram of a network connection management system according to a first embodiment.

Hereinafter, various embodiments of the present invention will be explained by referring to the drawings. The present invention is not limited to the following embodiments.

First Embodiment

FIG. 1 is a block diagram of a network connection management system according to the first embodiment. As shown in FIG. 1, the network connection management system includes a client terminal 10, a firewall 20, a reverse proxy server 30, a NAT router 40, and an internal network segment 50.

In the internal network segment 50, a management server 51, and a plurality of host PCs 52, 53, and 54 are set. The management server 51 and the plurality of host PCs 52, 53, and 54 are mutually connected by a communication network such as a LAN. The management server 51 is a server apparatus to establish connection from the host PCs 52, 53, and 54 to the reverse proxy server 30. In FIG. 1, three host PCs 52, 53, and 54 exist. However, the number of host PCs may be arbitrary.

In the network connection management system, the reverse proxy server 30 receives an access request from the client terminal 10 connected to an external network 60 such as the Internet. In FIG. 1, one client terminal 10 exists. However, the number of client terminals may be arbitrary. The host PCs 52, 53 and 54 to be connected with the client terminal 10 are set in the internal network segment 50. Furthermore, in order to keep independency of the communication network, the NAT router 40 is set between the reverse proxy server 30 and the internal network segment 50.

Accordingly, the reverse proxy server 30 cannot directly access the host PCs 52, 53, and 54. The management server 51 in the internal network segment 50 holds and manages data (host PC data) relative to the host PCs 52, 53, and 54, and processes a connection request from the reverse proxy server 30.

Next, inside functions of the reverse proxy server 30, the management server 51, and the host PCs 52, 53, and 54 are explained. As to the host PCs 52, 53, and 54, the host PC 52 is only explained. Other host PCs 53 and 54 are the same as the host PC 52.

Figure 2:
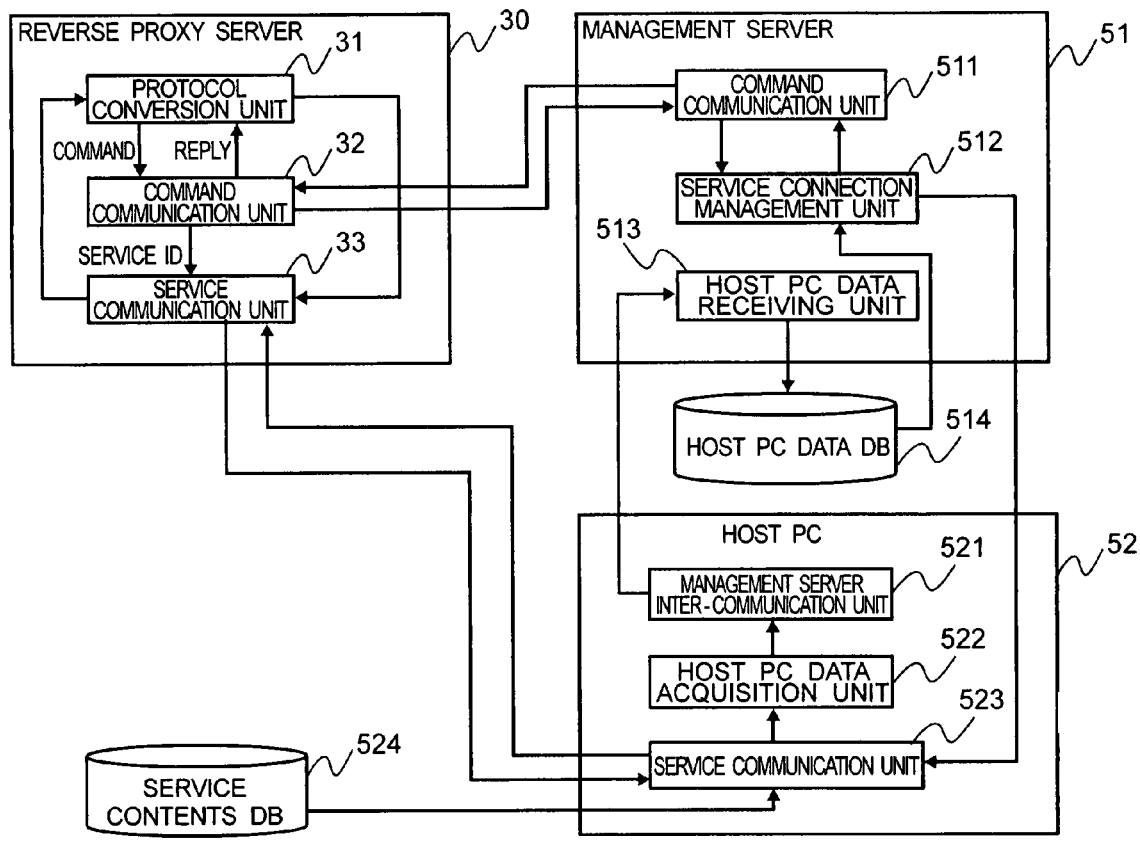
FIG. 2 is block diagrams of a reverse proxy server, a management server, and a host PC in FIG. 1.

FIG. 2 is a block diagram of the reverse proxy server 30, the management server 51, and the host PC 52 in order to explain the inside functions.

As shown in FIG. 2, the reverse proxy server 30 includes a protocol conversion unit 31, a command communication unit 32, and a service communication unit 33. The management server 51 includes a command communication unit 511, a service connection management unit 512, a host PC data receiving unit 513, and a host PC data DB 514. The host PC data DB may be set inside or outside the management server 51. The host PC 52 includes a management server inter-communication unit 521, a host PC data acquisition unit 522, a service communication unit 523, and a service contents DB 524. The service contents DB 524 may be set inside or outside the host PC 52.

As shown in FIG. 1, in the network connection management system, the firewall 20 is set between the external communication network 60 and the internal network segment 50 in order to limit access from the client terminal 10. In such a network, in order for the client terminal 10 to connect with any of host PCs 52, 53, and 54 in the internal network segment 50, the client terminal 10 and the reverse proxy server 30 both include a protocol conversion unit to convert protocol passable through the firewall 20. In FIG. 2, the protocol conversion unit 31 selectively supplies a message from the client terminal 10 to any of the command communication unit 32 and the service communication unit 33 based on a type of the message. The command communication unit 32 processes a command related with connection processing, and the service communication unit 33 processes data used for connection with the host PCs 52, 53, and 54.

The management server 51 periodically receives host PC data (necessary for connection management) from the host PCs 52, 53, and 54 in the internal network segment 50, and updates host PC data in the host PC data DB 514. In this case, the host PCs 52, 53, and 54 may periodically update host PC data of each host PC in the host PC data DB 514, and the host PC data receiving unit 513 in the management server 51 may periodically confirm host PC data in the host PC data DB 514.

FIG. 3 is a schematic diagram of one example of host PC data stored in the host PC data DB 514. As shown in FIG. 3, the host PC data includes a host PC name, a MAC (Media Access Control) address, an IP address, a group name to which the host PC belongs, a distributable service name representing distributable contents, a maximum number of connectable terminals or a maximum number of issuable session IDs, a number of client terminals presently connected, a maximum number of available network traffic, and a present network traffic. The host PC data is stored in correspondence with each host PC.

In the host PC data, the "present network traffic" is acquired from the service communication unit 523 of the host PC 52, and the remaining data is acquired from the host PC data acquisition unit 522. The "group name" is an ID value used by a plurality of host PCs to provide the same service. The acquired host PC data is stored in the host PC data DB 514. In the management server 51, when the command communication unit 511 receives a connection request from the client terminal 10 via the command communication unit 32 of the reverse proxy server 30, connection to service from the host PC 52 is decided to be permitted using the host PC data. Furthermore, if a plurality of host PCs can provide the same service to the client terminal, one host PC to connect with the client terminal is selected from the plurality of host PCs using the host PC data.

In order to process a connection request from the client terminal 10, a connection from the reverse proxy server 30 to the management server 51 is previously established. The command communication unit 511 in the management server 51 starts TCP (Transmission Control Protocol) connection with the command communication unit 32 in the reverse proxy server 30 immediately after startup. By starting connection from the management server 51 side, even if the NAT router exists between the reverse proxy server 30 and the management server 51, connection can be easily started. If a plurality of reverse proxy servers 30 exist because of load sharing, connection to process an access request is established to each reverse proxy server.

Figure 4:
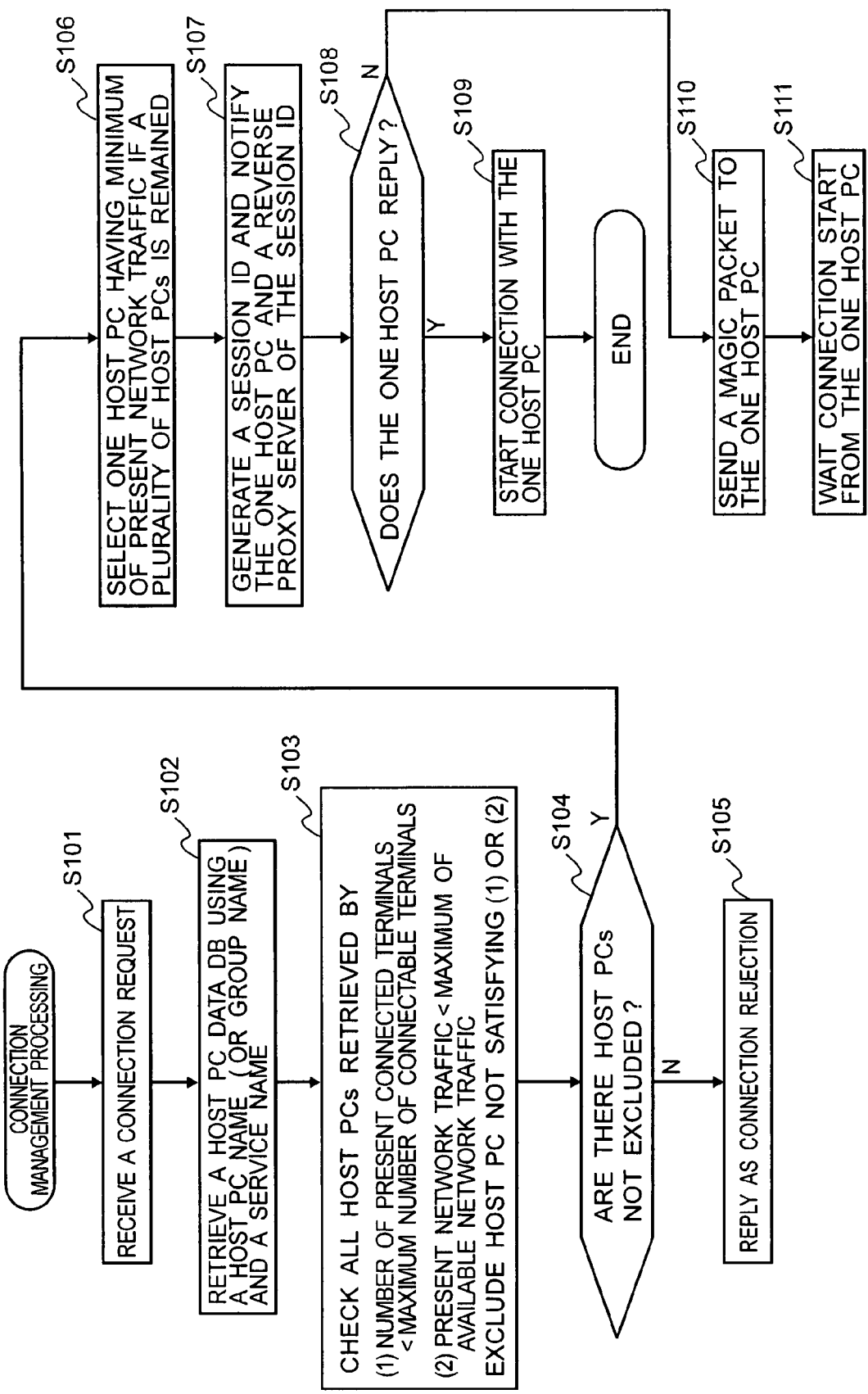
FIG. 4 is a flow chart of connection management processing according to the first embodiment.

Next, processing of the management server 51 in case that the reverse proxy server 30 receives a connection request (access request) from the client terminal 10 is explained. FIG. 4 is a flow chart of connection management processing of the management server 51.

In the connection management processing, when the management server 51 receives a connection request from the client terminal 10 via the reverse proxy server 30 (S101), the management server 51 retrieves the host PC data DB 514 using a host PC name or a group name (in case that a plurality of host PCs provides the same service) and a service name indicated by the connection request, and extracts a host PC matched with the connection request (S102).

The connection request from the client terminal 10 includes the host PC name or the group name, and the service name of desired contents. All host PC data of host PCs which have connected to the management server 51 are already stored in the host PC data DB 514. Accordingly, the management server 51 retrieves the host PC data DB 514 using key information (the host PC name or the group name, and the service name) included in the connection request.

Next, as to each host PC retrieved, the management server 51 checks whether a maximum number of connectable terminals is above a number of client terminals presently connected and whether a maximum of available network traffic is above a present network traffic (S103).

If a host PC satisfying both conditions of S103 does not exist (No at S104), none of the host PCs can provide service matched with the connection request. Accordingly, the management server 51 replies a connection rejection to the reverse proxy server 30 (S105).

If a plurality of host PCs each satisfying both conditions of S103 exists (Yes at S104), the management server 51 selects one host PC having minimum of present network traffic among the plurality of host PCs (S106). At S106, one host PC having the greatest difference between the maximum of available network traffic and the present network traffic may be selected. Furthermore, one host PC having the greatest difference between the maximum number of connectable terminals and the number of client terminals presently connected may be selected.

As mentioned-above, one host PC satisfying both conditions of S103 is selected. In this case, assume that a host PC 52 is selected. The management server 51 generates a unique session ID for connection service, and notifies the service communication unit 523 of the host PC 52 and the service communication unit 33 of the reverse proxy server 30 of the session ID as a connection start request (S107).

If the service communication unit 523 of the selected host PS 52 replies to the connection start request (S108), the management server 51 starts connection to distribute service from the host PC 52 to the client terminal 10 via the reverse proxy server 30 (S109). Hereinafter, the session ID is attached to a communication packet in addition to data pay load of the service. Briefly, after receiving a connection start request from the management server 51, the host PC 52 sends data with the session ID to the reverse proxy server 30. In response to the data with the session ID from the host PC 52, the reverse proxy server 30 sends (relays) the data to the client terminal 10. When the reverse proxy server 30 receives a reply message from the client terminal 10, the reverse proxy server 30 sends (relays) the reply message with the session ID to the host PC 52. In this way, data communication is executed. If the service communication unit 523 of the host PC 52 does not reply to the connection start request (S108), the management server 51 decides that a power of the host PC 52 temporarily turns off, and sends a magic packet of "Wake On LAN function" using MAC address in the host PC data to the host PC 52 (S110). Then the management server 51 waits for a connection start from the host PC 52 (S111).

As mentioned-above, in the first embodiment, the client terminal 10 cannot understand a component of the internal network segment 50 and a communication load of the host PC inside the reverse proxy server 30. If the host PC can provide the same service to a plurality of users (client terminals) or if a plurality of host PCs can provide the same service to a user (client terminal), decision to request which service of which host PC is executed based on host PC data such as network load periodically sent by the host PC. As a result, the client terminal can connect with the most adequate host PC.

Briefly, the reverse proxy server 30 relays data between the client terminal 10 connected to the external network 60 and the host PC 52 installed in the internal network segment 50 using a session ID. In response to a connection request from the client terminal 10 to the host PC 52 via the reverse proxy server 30, the management server 51 decides whether a connection to the host PC 52 is permitted based on host PC data having a host PC name of the host PC 52 and a service name distributable by the host PC 52, and notifies the reverse proxy server 30 and the host PC 52 of a unique session ID to start connection when the connection is permitted. The host PC 52 sends service data with the session ID after receiving the session ID from the management server 51. The reverse proxy server 30 sends the service data from the host PC 52 to the client terminal 10, and in response to reply data from the client terminal 10, sends the reply data with the session ID to the host PC 52. Accordingly, connection between the client terminal 10 connected to the external network 60 and the host PC 52 installed in the internal network segment 50 can be easily established without connection management by the external network side.

Furthermore, if the host PC 52 exists in the internal network segment 50 protected by the NAT router 40 and the firewall 20, connection can be started from the host PC side. Accordingly, the reverse proxy server 30 which sent the connection request need not manage an IP address and a port number of the host PC 52, and setting of the firewall 20.

Furthermore, even if a power of the host PC 52 temporarily turns off by accident, the management server 51 can send a magic packet to the host PC 52 by referring to host PC data of the host PC 52. As a result, the host PC 52 can reactivate by "Wake on LAN function" of the magic packet.

Figure 5:
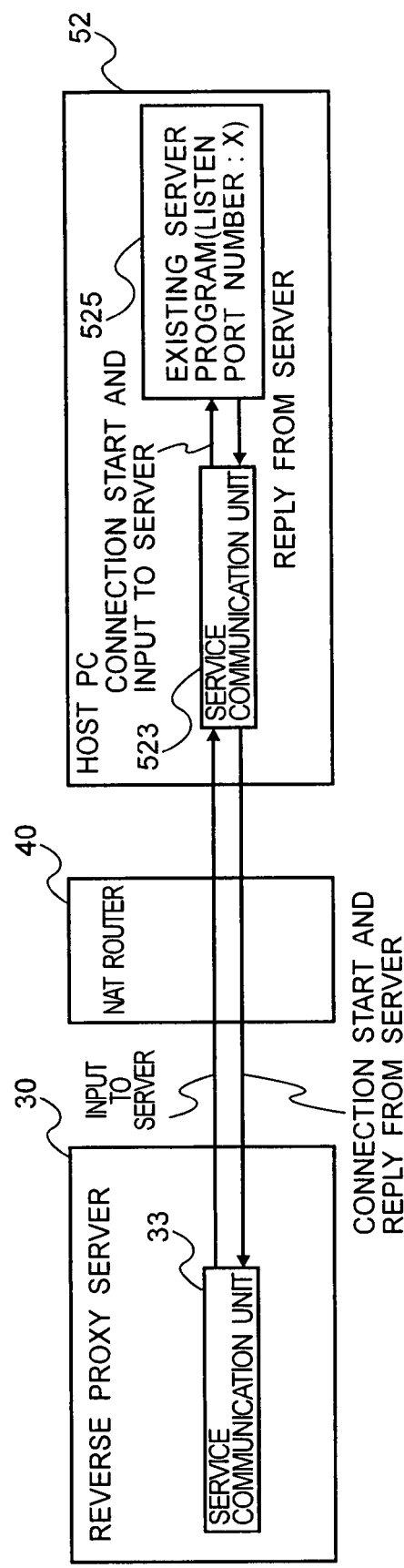
FIG. 5 is one example of connection from a reverse proxy server to an existing server program operating on a host PC.

In the first embodiment, a method for connecting with an existing server program operated on the host PC is not explained. Hereinafter, this method is explained. FIG. 5 is a schematic diagram of one example of the connection with the server program on the host PC.

As shown in FIG. 5, an existing server program 525 may operate on the host PC 52. Usually, in case of accessing from a client (In FIG. 5, the reverse proxy server 30) outside the NAT router 40 to the server program 525, the NAT router 40 permits connection to a listen port number X of the server program 525. However, in case that connection from outside of the NAT router 40 to the host PC 52 is not permitted in order to maintain security, this method cannot be used.

Accordingly, by using the service communication unit 523 in a service program 525 operated on the host PC 52, communication between the proxy server 30 and the server program 525 can be established.

As mentioned-above, the service communication unit 523 receives a connection request from the management server 51, and starts connection with the service communication unit 33 of the reverse proxy server 30. This function establishes a connection to provide service. In this case, a connection from the service communication unit 523 to the listen port number X of the server program 525 is also established. Accordingly, data communication between the reverse proxy server 30 and the server program 525 is executed without direct connection from the reverse proxy server 30 to the server program 525.

Briefly, while the server program is operating on the host PC, communication between the reverse proxy server 30 and the server program 525 can be established without direct connection from the reverse proxy server 30 to a listen port of the server program 525. Accordingly, security policy of the internal network segment 50 need not be significantly changed, and the existing server program 525 can be communicated with a safer method.

Second Embodiment

In the first embodiment, the management server 51 is inside the network segment 50, and the host PC 52, 53, and 54 can establish connection with the management server 51. However, the management server 51 is always operating. Accordingly, one host PC may have a function of the management server among a plurality of host PCs in the internal network segment 50. Program operation to realize this function in the host PC is shown in FIGS. 6 and 7.

Figure 6:
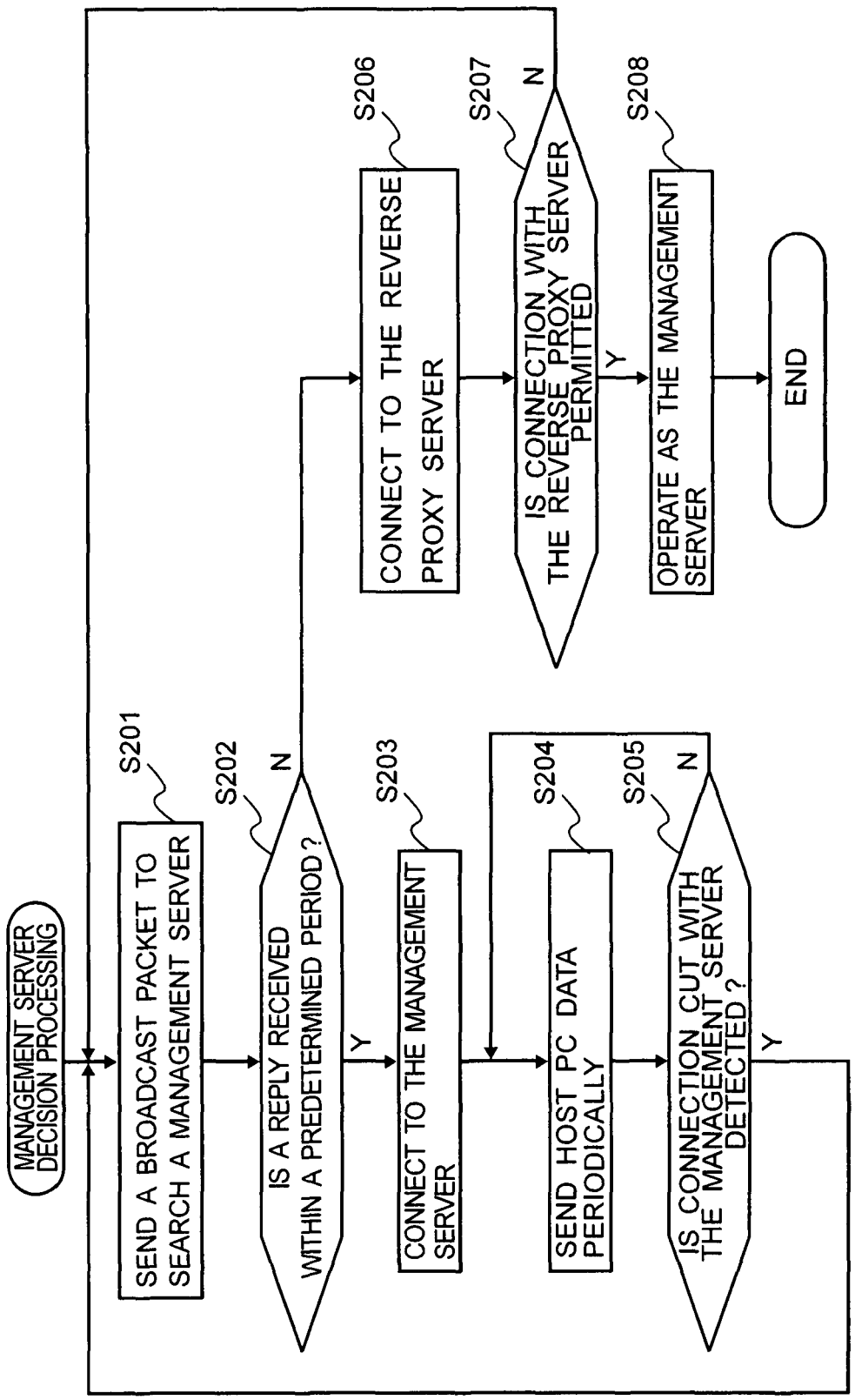
FIG. 6 is a flow chart of management server decision processing according to a second embodiment.
Figure 7:
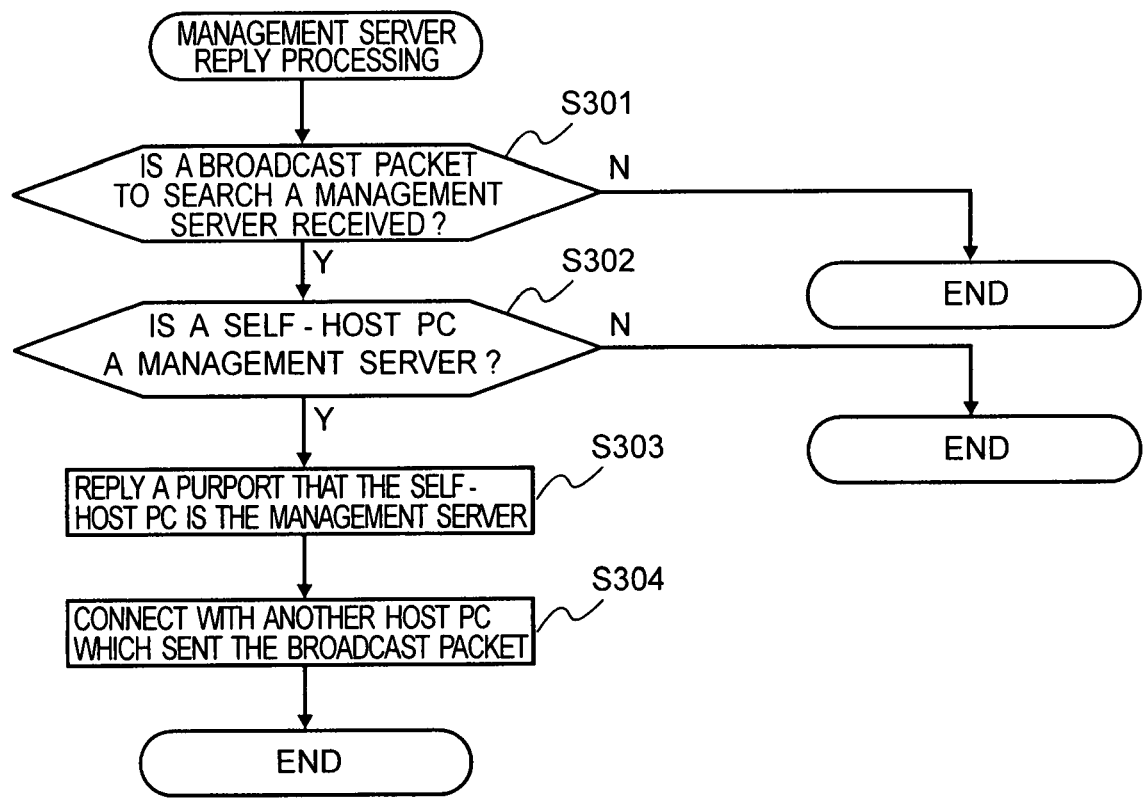
FIG. 7 is a flow chart of response processing for a search packet according to the second embodiment.

FIGS. 6 and 7 are flow charts of processing of each host PC in order for an arbitrary host PC to function as a management server. Concretely, FIG. 6 is a flow chart of processing to determine one host PC as the management server at startup. FIG. 7 is a flow chart of reply processing to react in case of receiving a broadcast packet to search the management server from another host PC. In the second embodiment, the management server 51 in FIG. 1 does not exist. Any of the host PCs 52, 53, and 54 may have a function of the management server 51.

In decision processing of management server, first, a host PC sends a broadcast packet at startup (S201), and checks whether a management server already exists in an internal network segment to which the host PC belongs (S202).

If a management server function is operated in any of other host PCs, as explained afterwards, a reply for the broadcast packet is received within a predetermined period.

In case of receiving a reply (Y at S202), the host PC specifies another host PC which sent the reply as a management server, and establishes connection with the management server (another host PC) by TCP communication (S203). After establishing connection, the host PC periodically sends host PC data to the management server (another host PC) (S204). In the same way as in the first embodiment, the host PC data includes a host PC name, a group name, a distributable service name, a maximum number of connectable terminals, a number of terminals presently connected, a maximum number of available network traffic, and a present network traffic.

On the other hand, in case of not receiving a reply (N at S202), the host PC decides that a management server is not operating, and executes a function of the management server by itself. The host PC may try to connect with the reverse proxy server 30 (S206). If this connection is permitted (Y at S207), the host PC starts operation as the management server (S208).

Furthermore, if a connection cut with the management server is detected (Y at S205), the host PC sends a broadcast packet again to search for another host PC having a management function (S201).

In the above-mentioned method, a plurality of host PCs possibly execute a management server function. In this case, each host PC needs to connect to the reverse proxy server 30 as the management server function at startup. Accordingly, the reverse proxy server 30 decides whether connection as the management server is permitted by an IP address from the host PC (source address). As a result, one host PC is selected as the management server in one internal network segment.

Figure 8:
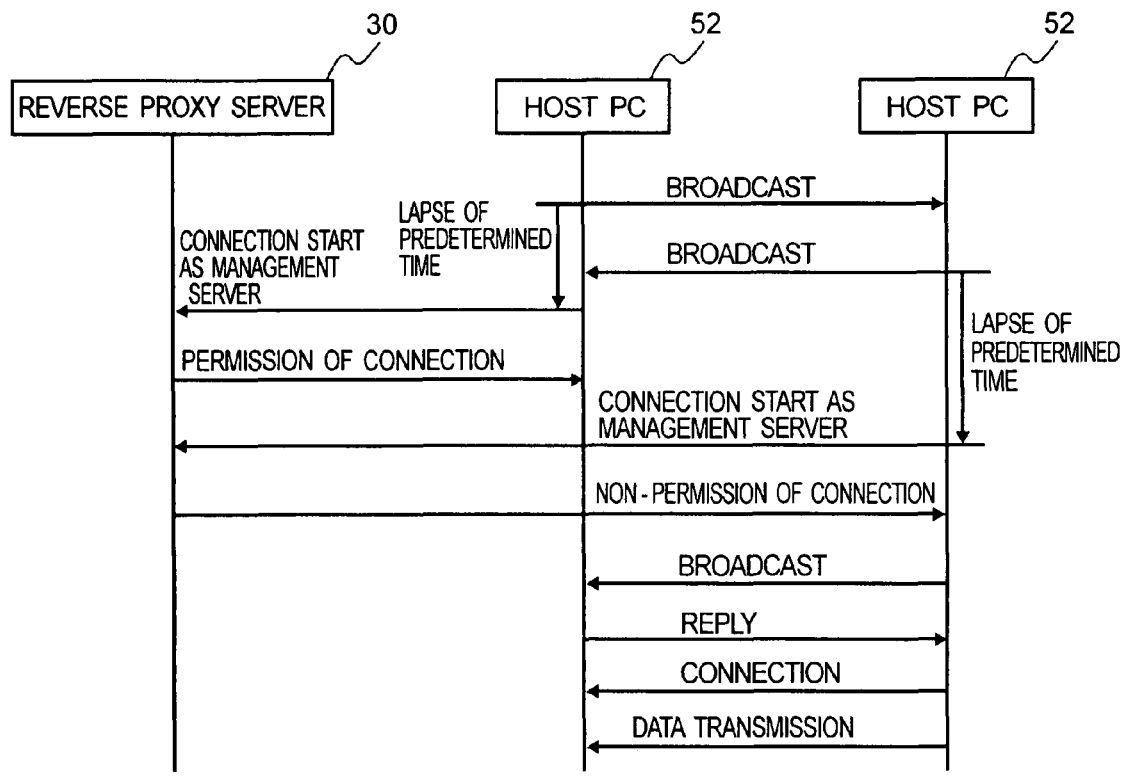
FIG. 8 is a sequence chart to set one management server in the internal network segment.

FIG. 8 is a sequence chart of control so that a plurality of management servers is not set in one internal network segment 50. In this case, when a management server is not set yet, an example that two host PCs 52 and 53 are startup at almost the same time is explained.

First, immediately after the host PC 52 sends a broadcast packet at startup, the host PC 53 sends a broadcast packet at startup. After pausing a predetermined period on condition that the host PC 52 does not receive a reply for the broadcast packet, the host PC 52 tries to connect with the reverse proxy server 30, and starts operation as a management server when the connection is permitted. On the other hand, after pausing a predetermined period on condition that the host PC 53 does not receive a reply for the broadcast packet, the host PC 53 also tries to connect with the reverse proxy server 30. However, this connection is not permitted by the reverse proxy server 30 because the host PC 52 is already permitted as the management server. Accordingly, the host PC 53 sends a broadcast packet again. As to the broadcast packet sent again, the host PC 52 sends a reply to the host PC 53. In response to the reply, the host PC 53 connects with the host PC 52 which operates as the management server, and the host PC 53 sends host PC data to the host PC 52.

As mentioned-above, a host PC sends a broadcast packet to search a management server at startup. If the host PC does not receive a reply from another host PC which operates as the management server for a predetermined period after sending the broadcast packet, the host PC requests connection as the management server to the reverse proxy server 30. Accordingly, without previously setting a management server in the internal network segment 50, a function of the management server can be assigned to any one host PC. As a result, it is not necessary for each host PC to confirm whether the management server is always operating.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A system for managing a connection between a client terminal connected to an external network and a host computer installed in an internal network segment, the system comprising:
    a reverse proxy server configured to receive a connection request from the client terminal and to relay data between the client terminal and the host computer using a session identifier ("ID"); and
    a management server installed in the internal network segment configured to, in response to the connection request from the client terminal via the reverse proxy server, decide whether a connection to the host computer is permitted based on host PC data having a host PC name of the host computer and a service name distributable by the host computer, and configured to generate the session ID and notify the session ID to both the reverse proxy server and the host computer, and, when the connection is permitted, to initiate the connection from the host computer to the client terminal;
    wherein the host computer sends service data and the session ID to the reverse proxy server after receiving the session ID from the management server,
    wherein the reverse proxy server relays the service data from the host computer to the client terminal, and in response to data received from the client terminal, relays the data received from the client computer to the host computer with the session ID.

2. The system according to claim 1, further comprising a host PC database configured to store the host PC data of the host computer for access by the management server,
    wherein the host PC data includes at least the host PC name, a group name to which a plurality of host PCs that distribute the same service belong, the service name, a maximum number of connectable terminals, a number of client terminals presently connected, a maximum of available network traffic, and data identifying present network traffic.

3. The system according to claim 2, wherein, if the plurality of host computers are installed in the internal network segment, the host PC database stores the host PC data of each of the plurality of host computers.

4. The system according to claim 3, wherein each of the plurality of host computers periodically updates the host PC data of the host computer in the host PC database.

5. The system according to claim 3, wherein, when the connection request includes the host PC name or the group name, and the service name, the management server retrieves the host PC database using the host PC name or the group name, and the service name.

6. The system according to claim 5, wherein, when a plurality of host computers are retrieved from the host PC database, the management server determines whether the maximum number of connectable terminals exceeds the number of client terminals presently connected and whether the maximum of available network traffic exceeds the present network traffic for each host computer.

7. The system according to claim 6, wherein, if a host computer is determined based on the maximum number of connectable terminals not exceeding the number of client terminals presently connected or the maximum of available network traffic not exceeding the present network traffic, the management server determines that a connection to the host computer is not permitted.

8. The system according to claim 7, wherein, if a plurality of host computers are determined based on the maximum number of connectable terminals exceeding the number of client terminals presently connected and the maximum of available network traffic exceeds the present network traffic, the management server selects one host computer having the greatest difference between the maximum number of connectable terminals and the number of client terminals presently connected or having the greatest difference between the maximum of available network traffic and the present network traffic.

9. The system according to claim 8, wherein, when the management server does not receive a reply from the selected host computer for a predetermined period after sending the session ID to the one host computer, the management server sends a magic packet to the selected host computer.

10. The system according to claim 1, wherein the host computer sends the session ID to start connection to the reverse proxy server, and starts connection with a listen port number of a server program to execute processing in the host computer.

11. The system according to claim 1, wherein the host computer sends a broadcast packet to search the management server at startup in the internal network segment.

12. The system according to claim 11, wherein, when the host computer receives a reply from the management server, the host computer connects with the management server, and periodically sends the host PC data to the management server.

13. The system according to claim 11, wherein, when the host computer does not receive a reply from the management server for a predetermined period after sending the broadcast packet, the host computer connects with the reverse proxy server to permit the host computer to operate as a management server.

14. The system according to claim 13, wherein, when the host computer receives permission from the reverse proxy server to operate as the management server, the host computer operates as the management server in the internal network segment.

15. The system according to claim 14, wherein, when the reverse proxy server receives a broadcast packet from an additional host computer after sending the permission to the host computer, the reverse proxy server sends the additional host computer data indicating that the additional host server is not permitted to operate as the management server.

16. The system according to claim 11, wherein, when the host computer operating as the management server receives a broadcast packet from an additional host computer, the management server sends a reply to the additional host computer indicating that the host computer is operating as the management server.

17. The system according to claim 16, wherein the additional host computer connects with the host computer operating as the management server after receiving the reply from host computer operating as the management server.

18. A method implemented by a management server for managing a connection between a client terminal connected to an external network and a host computer installed in an internal network segment, the management server being installed in the internal network segment, the method comprising:

receiving a connection request from the client terminal to the host computer via a reverse proxy server which relays data between the client terminal and the host computer using a session identifier ("ID");

deciding whether a connection to the host computer is permitted based on host PC data having a host PC name of the host computer and a service name distributable by the host computer;

generate the session ID;

notifying the session ID to both the reverse proxy server and the host computer when the connection is permitted, to initiate the connection from the host computer to the client terminal;

wherein the host computer sends service data and the session ID to the reverse proxy server after receiving the session ID from the management server, and wherein the reverse proxy server relays the service data from the host computer to the client terminal, and in response to data received from the client terminal, relays the data received from the client computer to the host computer with the session ID.

19. A management server for managing a connection between a client terminal connected to an external network and a host computer installed in an internal network segment, the management server being installed in the internal network segment, the management server comprising:

a storage unit configured to store host PC data having a host PC name of the host computer and a service name distributable by the host computer;

a connection decision unit configured to, in response to a connection request from the client terminal via a reverse proxy server, decide whether a connection to the host computer is permitted based on the host PC data;

a session ID generator configured to generate a session identifier ("ID"), wherein the reverse proxy server relays data between the client terminal and the host computer using the session ID;

a notification unit configured to notify the session ID to both the reverse proxy server and the host computer of the session ID when the connection is permitted; and a communication request unit configured to request the host computer to send service data with the session ID to the reverse proxy server, wherein the host computer sends service data and the session ID to the reverse proxy server after receiving the session ID from the management server, and wherein the reverse proxy server relays the service data from the host computer to the client terminal, and in response to data received from the client terminal, relays the data received from the client computer the host computer with the session ID.

20. The system according to claim 1, wherein the data received from the client device by the reverse proxy server does not include the session ID, and the reverse proxy server adds the session ID to the data received from the client device before relaying the data received from the client device to the host computer.

21. The system according to claim 1, wherein after the management server notifies the host PC of the service ID, the host ID sends the service data and the session ID to the reverse proxy server by including both the service data and the session ID in individual communication packets.

* * * * *